United States Patent
Zhang et al.

(10) Patent No.: US 11,866,537 B2
(45) Date of Patent: Jan. 9, 2024

(54) EASY-TO-PROCESS, OPAQUE AND HIGH-IMPACT METHYL METHACRYLATE-BUTADIENE-STYRENE POLYMER FOR POLYVINYL CHLORIDE AND PREPARATION METHOD THEREOF

(71) Applicant: SHANDONG DONGLIN NEW MATERIALS CO., LTD, Weifang (CN)

(72) Inventors: Xiaoquan Zhang, Weifang (CN); Tonggang Yi, Weifang (CN); Yongquan Xia, Weifang (CN); Honggang Zhao, Weifang (CN); Duo Xu, Weifang (CN); Boxiao Zou, Weifang (CN); Wen Liu, Weifang (CN); Xiaomin Ma, Weifang (CN)

(73) Assignee: SHANDONG DONGLIN NEW MATERIALS CO., LTD, Shandong (CN)

( * ) Notice: Subject to any disclaimer, the term of this patent is extended or adjusted under 35 U.S.C. 154(b) by 289 days.

(21) Appl. No.: 16/968,830

(22) PCT Filed: Dec. 14, 2019

(86) PCT No.: PCT/CN2019/125413
§ 371 (c)(1),
(2) Date: Aug. 10, 2020

(87) PCT Pub. No.: WO2020/164302
PCT Pub. Date: Aug. 20, 2020

(65) Prior Publication Data
US 2021/0371569 A1   Dec. 2, 2021

(30) Foreign Application Priority Data
Feb. 14, 2019   (CN) .......................... 201910113748.5

(51) Int. Cl.
*C08F 291/02*   (2006.01)
*C08L 27/06*   (2006.01)

(52) U.S. Cl.
CPC ............ *C08F 291/02* (2013.01); *C08L 27/06* (2013.01); *C08L 2205/035* (2013.01); *C08L 2207/53* (2013.01); *C08L 2312/00* (2013.01)

(58) Field of Classification Search
CPC ................................. C08F 291/02; C08F 27/06
USPC ........................................................ 523/201
See application file for complete search history.

(56) References Cited

FOREIGN PATENT DOCUMENTS

| CN | 1247201 A | | 3/2000 |
|---|---|---|---|
| CN | 101492519 A | * | 7/2009 |
| CN | 101492519 A | | 7/2009 |
| CN | 101544731 | | 9/2009 |
| CN | 109971086 | | 7/2019 |

OTHER PUBLICATIONS

Written opinion and search report for PCT/CN2019/125413, dated Dec. 14, 2019, Shandong Donglin New Materials Co., Ltd—owned by Applicant.

* cited by examiner

*Primary Examiner* — Deve V Hall
(74) *Attorney, Agent, or Firm* — Hayes Soloway PC

(57) ABSTRACT

The present invention discloses an easy-to-process, opaque and high-impact methyl methacrylate-butadiene-styrene (MBS) polymer for polyvinyl chloride (PVC) and a preparation method thereof, and relates to the technical field of preparation of PVC additives. The easy-to-process, opaque and high-impact MBS for PVC has a core-kernel-shell (three-layer) structure, and includes the following components by mass: 1-20% of core, 70-85% of kernel and 5-20% of shell. The core is a semi-hard, lightly crosslinked copolymer of a styrene (St) monomer and an acrylate monomer. The kernel is a soft, lightly crosslinked butadiene (BD)-St polymer with a low glass transition temperature. The shell is a copolymer of St, butyl acrylate and methyl methacrylate (MMA) with a high glass transition temperature. The present invention solves the problems of low impact strength and poor processing fluidity of the existing MBS for opaque PVC products.

20 Claims, No Drawings

EASY-TO-PROCESS, OPAQUE AND HIGH-IMPACT METHYL METHACRYLATE-BUTADIENE-STYRENE POLYMER FOR POLYVINYL CHLORIDE AND PREPARATION METHOD THEREOF

The present application claims priority to Chinese Patent Application No. 201910113748.5 filed to the China National Intellectual Property Administration (CNIPA) on Feb. 14, 2019 and entitled "EASY-TO-PROCESS, OPAQUE AND HIGH-IMPACT METHYL METHACRYLATE-BUTADIENE-STYRENE POLYMER FOR POLYVINYL CHLORIDE AND PREPARATION METHOD THEREOF", which is incorporated herein by reference in its entirety.

TECHNICAL FIELD

The present invention relates to the technical field of preparation of polyvinyl chloride (PVC) additives, and in particular to an easy-to-process, opaque and high-impact methyl methacrylate-butadiene-styrene (MBS) polymer for PVC and a preparation method thereof.

BACKGROUND

Methyl methacrylate-butadiene-styrene (MBS) polymer is an important toughening material for transparent and opaque polyvinyl chloride (PVC) products. The MBS for opaque PVC products is required to have excellent impact strength and processing fluidity, which is the goal pursued at present.

The MBS resin is a functional polymer synthesized based on the particle design concept and a ternary polymer prepared by emulsion graft polymerization. The MBS has a typical core-shell structure in submicroscopic morphology. The core of the particle is a styrene-butadiene (St-BD) rubber core with low shear modulus after light crosslinking, which plays a major role in improving the impact strength and toughness of the polymer. The shell is a hard shell formed by grafting St and methyl methacrylate (MMA). In the shell, the main function of the MMA is to improve the compatibility of the MBS and the PVC, so that the MBS can be evenly dispersed in the PVC; the St is mainly to improve the refractive index (RI) of the MBS resin so that the RI of the MBS is similar to the PVC. Therefore, the MBS resin is a typical particle-dispersed toughening modifier.

The MBS is semi-compatible with the PVC. That is, the MBS not only has good interface compatibility with the PVC resin, but also keeps the particle shape intact in the PVC/MBS system. When the amount of the MBS added is small, the MBS is well dispersed in the PVC. The MBS presents as spherical particles, which cannot form a dispersed "sea-island" structure to transmit the impact energy, so its toughening effect on the material is poor. As the amount of the NIBS resin added increases, the dispersed particles gradually coalesce to form a "sea-island" structure. When the material is impacted by external force, the rubber core in the NIBS resin acts as a stress concentration point to deform and induce silver streaks and shear bands around. The silver streaks and shear bands disperse and absorb the impact energy to form a transition from brittle fracture to ductile fracture, thereby achieving the purpose of toughening.

In the typical core-shell structure of the MBS, the inner layer is a soft rubber phase, mainly a BD-based BD-St copolymer, and the outer layer is a hard plastic phase, mainly a MMA-St copolymer. A large number of tests have shown that the impact strength of this structure is not high. In view of the above, the present invention proposes a core-kernel-shell structure. The impact strength of the three-layer structure is greatly improved compared with the existing core-shell structure.

SUMMARY

In order to solve the technical defects existing in the prior art, the present invention provides an easy-to-process, opaque and high-impact methyl methacrylate-butadiene-styrene (MBS) polymer for polyvinyl chloride (PVC) and a preparation method thereof. The present invention obtains a three-layer polymer and improves the impact strength of the polymer. The present invention solves the problems of low impact strength and poor processing fluidity of the existing MBS for opaque PVC products.

To achieve the above purpose, the present invention provides an easy-to-process, opaque and high-impact methyl methacrylate-butadiene-styrene (MBS) polymer for polyvinyl chloride (PVC), having a core-kernel-shell (three-layer) structure, where the MBS includes the following components by mass: 1-20% of core, 70-85% of kernel and 5-20% of shell;

the core is a semi-hard, lightly crosslinked copolymer of a styrene (St) monomer and an acrylate monomer; the ratio of the St monomer to the acrylate monomer is 95:5 to 5:95;
the St monomer includes St or methylstyrene;
the acrylate monomer includes one or more of methyl acrylate, ethyl acrylate, butyl acrylate, and 2-ethylhexyl acrylate;
the kernel is a soft, lightly crosslinked butadiene (BD)-St polymer with a low glass transition temperature, and the ratio of the BD to the St is 100:0 to 80:20;
the shell is a copolymer of St, butyl acrylate and methyl methacrylate (MMA) with a high glass transition temperature; the St, the butyl acrylate and the MMA account for 0.2-5%, 0.2-2% and 13-20% by mass, respectively.

Preferably, the core accounts for 1-15%.
Preferably, the core accounts for 1-12%.
Preferably, the ratio of the St monomer to the acrylate monomer in the core is 90:10 to 10:90.
Preferably, the ratio of the St monomer to the acrylate monomer in the core is 85:15 to 15:85.
Preferably, the kernel accounts for 75-85%.
Preferably, the ratio of the BD to the St in the kernel is 100:0 to 85:15.
Preferably, the ratio of the BD to the St in the kernel is 100:0 to 90:10.
Preferably, the ratio of the BD to the St in the kernel is 100:0 to 95:5.
Preferably, the shell accounts for 7-20%.
Preferably, the shell accounts for 9-19%.

A method for preparing the easy-to-process, opaque and high-impact MBS for PVC includes the following steps:
(1) adding water, an emulsifier, an inorganic salt, a molecular weight regulator, a copolymer of a St monomer and an acrylate monomer, a crosslinking agent and an initiator to a reactor according to a formulated amount; closing a lid of the reactor, and heating to a reaction temperature to carry out a reaction until the reaction is completed; or adding an emulsion that has been reacted at the formulated amount into a separate MBS reactor to carry out the reaction to form a core seed;

(2) adding water, an emulsifier, an inorganic salt solution, a molecular weight regulator, a crosslinking agent and an initiator to a high pressure reactor; closing a lid of the reactor and tightening a bolt; injecting BD or a BD-St copolymer into the reactor;

(3) heating to 70° C. until the reaction is completed;

(4) adding a mixture of emulsifier, outer St monomer, butyl acrylate and MMA to the reactor; continuing the reaction for 1-3 h until the reaction is completed; and (5) discharging a reaction product; coagulating a latex by a coagulation method; then centrifuging by a centrifuge, drying by a bubbling fluidized bed (BFB), sieving, and packing to obtain a finished product.

Compared with the prior art, the present invention has the following beneficial effects.

The present invention provides an easy-to-process, opaque and high-impact MBS polymer for PVC and a preparation method thereof. The easy-to-process, opaque and high-impact MBS for PVC includes methyl acrylate, butadiene (BD), styrene (St) and acrylate. It is a special three-layer (core-kernel-shell) polymer. The inner core is a semi-hard, lightly crosslinked copolymer of a St monomer and an acrylate monomer, which accounts for 1-20%. The intermediate kernel is a soft, lightly crosslinked BD-St polymer with a low glass transition temperature, which accounts for 70-85%. The outer shell is a copolymer of St, butyl acrylate and methyl methacrylate (MMA) with a high glass transition temperature, which accounts for 5-20%.

The impact strength of the core-kernel-shell structure of the product provided by the present invention is greatly improved compared to the existing core-shell structure. When the material is impacted by external force, the rubber kernel of the intermediate layer of the MBS resin is deformed, and silver streaks and shear bands are induced around. The impact energy is quickly transferred to the hard core, and the hard core produces a larger area of silver streaks and shear bands, thereby absorbing more impact energy. In this way, the MBS achieves a better toughening effect, and improves the impact strength of the polymer.

DETAILED DESCRIPTION

In order to further explain the beneficial effects of the present invention, a large number of tests have been performed. It should be noted that the tests of the present invention are intended to illustrate the beneficial technical effects of the present invention, and are not limited to the scope of the present invention.

Example 1

(1) Add water, an emulsifier, an inorganic salt, a molecular weight regulator, a copolymer of a styrene (St) monomer and a butyl acrylate monomer (95:5), a crosslinking agent and an initiator to a reactor according to a formulated amount; close a lid of the reactor, and heat to a reaction temperature to carry out a reaction until the reaction is completed; or add an emulsion that has been reacted at the formulated amount into a separate MBS reactor to carry out the reaction to form a core seed, the core accounting for 10%.

(2) Add water, an emulsifier, an inorganic salt solution, a 10% core seed, a molecular weight regulator, a crosslinking agent and an initiator to a high pressure reactor; close a lid of the reactor and tighten a bolt; inject butadiene (BD) and St into the reactor, where the ratio of the BD to the St is 95:5, and an intermediate layer accounts for 75%.

(3) Heat to 70° C. until the reaction is completed.

(4) Add a mixture of emulsifier, outer St monomer, butyl acrylate and methyl methacrylate (MMA) which account for 2%, 2% and 11% respectively to the reactor; continue the reaction for 1-3 h until the reaction is completed.

(5) Discharge a reaction product; coagulate a latex by a coagulation method; then centrifuge by a centrifuge, dry by a bubbling fluidized bed (BFB), sieve, and pack to obtain a finished product.

Example 2

The ratio of the St monomer to the butyl acrylate monomer in the core in step (1) of Example 1 was changed as 75:25, and the rest were the same as in Example 1.

Example 3

The ratio of the St monomer to the butyl acrylate monomer in the core in step (1) of Example 1 was changed as 50:50, and the rest were the same as in Example 1.

Example 4

The ratio of the St monomer to the butyl acrylate monomer in the core in step (1) of Example 1 was changed as 25:75, and the rest were the same as in Example 1.

Example 5

The ratio of the St monomer to the butyl acrylate monomer in the core in step (1) of Example 1 was changed as 5:95, and the rest were the same as in Example 1.

Example 6

The ratio of the BD to the St in the intermediate layer in step (2) of Example 1 was changed as 80:20, and the rest were the same as in Example 1.

Example 7

The ratio of the BD to the St in the intermediate layer in step (2) of Example 1 was changed as 90:10, and the rest were the same as in Example 1.

Example 8

The intermediate layer in step (2) of Example 1 was changed to pure BD, and the remaining were the same as in Example 1.

Example 9

The proportion of the core in step (1) of Example 1 was changed to 3%, and the proportion of the intermediate layer in step (2) was changed to 82%; the rest were the same as in Example 1.

Example 10

The proportion of the core in step (1) of Example 2 was changed to 3%, and the proportion of the intermediate layer in step (2) was changed to 82%; the rest were the same as in Example 2.

Example 11

The proportion of the core in step (1) of Example 3 was changed to 3%, and the proportion of the intermediate layer in step (2) was changed to 82%; the rest were the same as in Example 3.

Example 12

The proportion of the core in step (1) of Example 4 was changed to 3%, and the proportion of the intermediate layer in step (2) was changed to 82%, and the rest were the same as in Example 4.

Example 13

The proportion of the core in step (1) of Example 5 was changed to 3%, and the proportion of the intermediate layer in step (2) was changed to 82%, and the rest were the same as in Example 5.

Example 14

The proportion of the core in step (1) of Example 1 was changed to 15%, and the proportion of the intermediate layer in step (2) was changed to 70%, and the rest were the same as in Example 1.

Example 15

The proportion of the core in step (1) of Example 2 was changed to 15%, and the proportion of the intermediate layer in step (2) was changed to 70%; the rest were the same as in Example 2.

Comparative Example 1

The core in Example 1 was replaced with an intermediate layer, and the rest were the same as in Example 1.

Comparative Example 2

The core in Example 2 was replaced with an intermediate layer, and the rest were the same as in Example 2.

Comparative Example 3

The core in Example 3 was replaced with an intermediate layer, and the rest were the same as in Example 3.

Comparative Example 4

The core in Example 4 was replaced with an intermediate layer, and the rest were the same as in Example 4.

Comparative Example 5

The core in Example 5 was replaced with an intermediate layer, and the rest were the same as in Example 5.

Comparative Example 6

The core in Example 6 was replaced with an intermediate layer, and the rest were the same as in Example 6.

Comparative Example 7

The core in Example 7 was replaced with an intermediate layer, and the rest were the same as in Example 7.

Comparative Example 8

The core in Example 8 was replaced with an intermediate layer, and the rest were the same as in Example 8.

Comparative Example 9

The ratio of the St to the butyl acrylate in the core in Example 1 was changed as 100:0, and the rest were the same as in Example 1.

Comparative Example 10

The ratio of the St to the butyl acrylate in the core in Example 1 was changed as 0:100, and the rest were the same as in Example 1.

Table 1 provides a result of performance comparison of the easy-to-process, opaque and high-impact MBS for PVC obtained by the examples and the products obtained by the comparative examples of the present invention.

TABLE 1

Performance comparison of products obtained by examples and comparative examples

| | Instance | Processing fluidity | Brittleness of downstream products | Impact resistance |
|---|---|---|---|---|
| Examples | Example 1 | ◎◎◎◎◎ | ●●●● | 17.5 |
| | Example 2 | ◎◎◎◎◎ | ●●●●● | 17.8 |
| | Example 3 | ◎◎◎◎◎ | ●●●●● | 18.4 |
| | Example 4 | ◎◎◎◎◎ | ●●●●● | 18.0 |
| | Example 5 | ◎◎◎◎◎ | ●●●●● | 17.1 |
| | Example 6 | ◎◎◎◎◎ | ●●●●● | 15.1 |
| | Example 7 | ◎◎◎◎◎ | ●●●●● | 16.9 |
| | Example 8 | ◎◎◎◎◎ | ●●●●● | 17.1 |
| | Example 9 | ◎◎◎ | ●●●●● | 17.5 |
| | Example 10 | ◎◎◎ | ●●●●● | 15.2 |
| | Example 11 | ◎◎◎ | ●●●●● | 15.8 |
| | Example 12 | ◎◎◎ | ●●●●● | 16.9 |
| | Example 13 | ◎◎◎ | ●●●●● | 15.9 |
| | Example 14 | ◎◎◎◎◎ | ●●●●● | 15.2 |
| | Example 15 | ◎◎◎◎◎ | ●●●●● | 15.8 |
| Comparative Examples | Comparative Example 1 | ◎◎ | ●●●●● | 15.1 |
| | Comparative Example 2 | ◎◎ | ●●●●● | 14.9 |
| | Comparative Example 3 | ◎◎ | ●●●●● | 14.6 |
| | Comparative Example 4 | ◎◎ | ●●●●● | 14.2 |
| | Comparative Example 5 | ◎◎ | ●●●●● | 13.9 |
| | Comparative Example 6 | ◎◎ | ●●●●● | 13.2 |
| | Comparative Example 7 | ◎◎ | ●●●●● | 13.5 |
| | Comparative Example 8 | ◎◎ | ●●●●● | 14.1 |
| | Comparative Example 9 | ◎◎ | ●● | 16.3 |
| | Comparative Example 10 | ◎◎ | ●●●●● | 14.2 |

Remarks:
1. (1) Processing Fluidity
Low ◎, ◎◎, ◎◎◎, ◎◎◎◎, ◎◎◎◎◎ high;
(2) Brittleness of Downstream Products: Higher Brittleness Leads to Poorer Performance
High ●, ●●, ●●●, ●●●●, ●●●●● low;
2. The formula used to improve the impact strength in the table includes 100 parts of PVC, 1.2 parts of organotin, 12 parts of light calcium carbonate, 0.6 parts of DL-74 (polyethylene wax), 0.6 parts of DL-60 (pentaerythritol stearate), 0.9 parts of calcium stearate, 5 parts of titanium dioxide and 8 parts of MBS.

The present invention is applicable to opaque MBS, transparent MBS MBS used for engineering plastics, and impact-resistant acrylic copolymer (ACR).

The above described are merely preferred examples of the present invention and are not intended to limit the present invention in any form. Any simple variations, material changes and equivalent transformations and modifications made to the above examples based on the technical essence of the present invention without departing from the technical solution of the present invention should fall within the scope of the technical solution of the present invention.

The above description of the examples is intended to help understand the method and core idea of the present invention. It should be noted that, several improvements and modifications may be made by persons of ordinary skill in the art without departing from the principle of the present invention, and these improvements and modifications should also be considered within the protection scope of the present invention. Various modifications to these examples are readily apparent to persons skilled in the art, and the generic principles defined herein may be practiced in other examples without departing from the spirit or scope of the invention. Thus, the present invention is not limited to the examples shown herein but falls within the widest scope consistent with the principles and novel features disclosed herein.

What is claimed is:

1. An easy-to-process, opaque and high-impact methyl methacrylate-butadiene-styrene (MBS) polymer for polyvinyl chloride (PVC), having a core-kernel-shell (three-layer) structure, wherein the MBS comprises the following components by mass: 1-20% of core, 70-85% of kernel and 5-20% of shell;
   the core is a semi-hard, lightly crosslinked copolymer of a styrene (St) monomer and an acrylate monomer; the ratio of the St monomer to the acrylate monomer is 95:5 to 5:95;
   the St monomer comprises St or methylstyrene;
   the acrylate monomer comprises one or more of methyl acrylate, ethyl acrylate, butyl acrylate, and 2-ethylhexyl acrylate;
   the kernel is a soft, lightly crosslinked butadiene (BD)-St polymer with a low glass transition temperature, and the ratio of the BD to the St is 100:0 to 80:20;
   the shell is a copolymer of St, butyl acrylate and methyl methacrylate (MMA) with a high glass transition temperature; the St, the butyl acrylate and the MMA account for 0.2-5%, 0.2-2% and 13-20% by mass, respectively.

2. The easy-to-process, opaque and high-impact MBS for PVC according to claim 1, wherein the core accounts for 1-15%.

3. The easy-to-process, opaque and high-impact MBS for PVC according to claim 2, wherein the ratio of the St monomer to the acrylate monomer in the core is 90:10 to 10:90.

4. The easy-to-process, opaque and high-impact MBS for PVC according to claim 3, wherein the kernel accounts for 75-85%.

5. The easy-to-process, opaque and high-impact MBS for PVC according to claim 4, wherein the ratio of the BD to the St in the kernel is 100:0 to 90:10.

6. The easy-to-process, opaque and high-impact MBS for PVC according to claim 5, wherein the shell accounts for 7-20%.

7. The easy-to-process, opaque and high-impact MBS for PVC according to claim 4, wherein the ratio of the BD to the St in the kernel is 100:0 to 95:5.

8. The easy-to-process, opaque and high-impact MBS for PVC according to claim 7, wherein the shell accounts for 7-20%.

9. The easy-to-process, opaque and high-impact MBS for PVC according to claim 2, wherein the ratio of the St monomer to the acrylate monomer in the core is 90:10 to 10:90.

10. The easy-to-process, opaque and high-impact MBS for PVC according to claim 9, wherein the kernel accounts for 75-85%.

11. The easy-to-process, opaque and high-impact MBS for PVC according to claim 10, wherein the ratio of the BD to the St in the kernel is 100:0 to 85:15.

12. The easy-to-process, opaque and high-impact MBS for PVC according to claim 11, wherein the ratio of the BD to the St in the kernel is 100:0 to 85:15.

13. The easy-to-process, opaque and high-impact MBS for PVC according to claim 10, wherein the ratio of the BD to the St in the kernel is 100:0 to 90:10.

14. The easy-to-process, opaque and high-impact MBS for PVC according to claim 13, wherein the ratio of the BD to the St in the kernel is 100:0 to 95:5.

15. The easy-to-process, opaque and high-impact MBS for PVC according to claim 11, wherein the ratio of the BD to the St in the kernel is 100:0 to 85:15.

16. The easy-to-process, opaque and high-impact MBS for PVC according to claim 15, wherein the shell accounts for 9-19%.

17. The easy-to-process, opaque and high-impact MBS for PVC according to claim 15, wherein the shell accounts for 7-20%.

18. The easy-to-process, opaque and high-impact MBS for PVC according to claim 1, wherein the core accounts for 1-12%.

19. The easy-to-process, opaque and high-impact MBS for PVC according to claim 18, wherein the ratio of the St monomer to the acrylate monomer in the core is 85:15 to 15:85.

20. A method for preparing the easy-to-process, opaque and high-impact MBS for PVC according to claim 1, comprising the following steps:
   (1) adding water, an emulsifier, an inorganic salt, a molecular weight regulator, a copolymer of a St monomer and an acrylate monomer, a crosslinking agent and an initiator to a reactor according to a formulated amount; closing a lid of the reactor, and heating to a reaction temperature to carry out a reaction until the reaction is completed; or adding an emulsion that has been reacted at the formulated amount into a separate MBS reactor to carry out the reaction to form a core seed;
   (2) adding water, an emulsifier, an inorganic salt solution, a molecular weight regulator, a crosslinking agent and an initiator to a high pressure reactor; closing a lid of the reactor and tightening a bolt; injecting BD or a BD-St copolymer into the reactor;
   (3) heating to 70° C. until the reaction is completed;
   (4) adding a mixture of emulsifier, outer St monomer, butyl acrylate and MMA to the reactor; continuing the reaction for 1-3 hours until the reaction is completed; and
   (5) discharging a reaction product; coagulating a latex by a coagulation method; then centrifuging by a centrifuge, drying by a bubbling fluidized bed (BFB), sieving, and packing to obtain a finished product.

* * * * *